US012223815B2

(12) United States Patent
Hlushchenko et al.

(10) Patent No.: US 12,223,815 B2
(45) Date of Patent: Feb. 11, 2025

(54) SMOKE DETECTION DEVICE, A SCATTERED LIGHT SENSOR OF THE SMOKE DETECTION DEVICE, AND A METHOD FOR DETECTING A SMOKE BY MEANS OF THE DEVICE

(71) Applicant: AJAX SYSTEMS CYPRUS HOLDINGS LTD, Nicosia (CY)

(72) Inventors: Mykhailo Hlushchenko, Kyiv (UA); Volodymyr Maiorov, Novomyrhorod (UA)

(73) Assignee: AJAX SYSTEMS CYPRUS HOLDINGS LTD, Nicosia (CY)

( * ) Notice: Subject to any disclaimer, the term of this patent is extended or adjusted under 35 U.S.C. 154(b) by 78 days.

(21) Appl. No.: 18/322,070

(22) Filed: May 23, 2023

(65) Prior Publication Data

US 2024/0054875 A1 Feb. 15, 2024

(30) Foreign Application Priority Data

Aug. 12, 2022 (UA) .............................. a 2022 02905

(51) Int. Cl.
*G08B 17/107* (2006.01)

(52) U.S. Cl.
CPC .................................. *G08B 17/107* (2013.01)

(58) Field of Classification Search
None
See application file for complete search history.

(56) References Cited

U.S. PATENT DOCUMENTS

| | | | | |
|---|---|---|---|---|
| 4,156,816 A * | 5/1979 | Lindgren | G08B 17/103 340/630 |
| 6,653,942 B2 * | 11/2003 | Kadwell | G08B 17/113 340/630 |
| 7,564,365 B2 * | 7/2009 | Marman | G08B 17/103 340/630 |
| 8,773,272 B2 * | 7/2014 | Nagashima | G08B 25/002 340/630 |
| 9,541,501 B2 | 1/2017 | Allemann et al. | |
| 9,915,609 B1 * | 3/2018 | Erdtmann | G01N 21/53 |

(Continued)

FOREIGN PATENT DOCUMENTS

KR 10-1963111 B1 7/2019

*Primary Examiner* — Muhammad Adnan
(74) *Attorney, Agent, or Firm* — Saliwanchik, Lloyd & Eisenschenk

(57) ABSTRACT

A smoke detection device comprises a housing, a control unit with a power unit, and a scattered light sensor. The sensor comprises an optical chamber having a first emitter, a second emitter, and a photoreceiver therein. The optical chamber is within a filtration chamber having output openings that are coupled to the optical chamber via a labyrinth that terminates as a ring slit between the optical chamber and the filtration chamber. The control unit constantly provides power impulses to the first emitter, and connects the second emitter to the power unit at a moment when a threshold signal arises at the photoreceiver, determines signal levels of the photoreceiver that arise during providing of the power impulses to the first and the second emitters, and initiates an alarm if the level within the second emitter connection period is at least 20% greater than the level within the first emitter connection period.

9 Claims, 8 Drawing Sheets

(56) References Cited

U.S. PATENT DOCUMENTS

| | | | | |
|---|---|---|---|---|
| 10,769,921 | B2 * | 9/2020 | Patel | G08B 29/145 |
| 11,195,400 | B2 * | 12/2021 | Gao | G01N 21/53 |
| 2015/0009036 | A1 * | 1/2015 | Lee | G08B 17/103 340/632 |
| 2015/0102934 | A1 * | 4/2015 | Erdtmann | G01N 21/53 340/630 |
| 2015/0228171 | A1 * | 8/2015 | Aebersold | G08B 17/107 340/630 |
| 2016/0335866 | A1 * | 11/2016 | Urrutia | G08B 17/10 |
| 2017/0046936 | A1 * | 2/2017 | Aebersold | H01L 31/167 |
| 2017/0213434 | A1 * | 7/2017 | Bressanutti | G08B 17/113 |
| 2020/0250951 | A1 * | 8/2020 | Chiang | G08B 17/117 |
| 2021/0088442 | A1 * | 3/2021 | Dohi | G01N 21/53 |
| 2021/0372913 | A1 * | 12/2021 | Bachels | G08B 17/107 |
| 2022/0120672 | A1 | 4/2022 | Uchida et al. | |
| 2023/0258870 | A1 * | 8/2023 | Sappey | G01N 21/255 356/409 |
| 2024/0038055 | A1 * | 2/2024 | Chen | G08B 29/183 |
| 2024/0078887 | A1 * | 3/2024 | Tsai | G08B 17/107 |

* cited by examiner

SMOKE DETECTION DEVICE, A SCATTERED LIGHT SENSOR OF THE SMOKE DETECTION DEVICE, AND A METHOD FOR DETECTING A SMOKE BY MEANS OF THE DEVICE

CROSS-REFERENCE TO RELATED APPLICATION

This application claims priority to Ukrainian Application No. a 2022 02905, filed Aug. 12, 2022, which is hereby incorporated by reference in its entirety.

FIELD OF THE INVENTION

The group of inventions relates to a field of fire alarm, in particular, to a smoke detection device for detecting the smoke by detecting a scattered light emission, to a scattered light sensor that is mounted in the device, and to a method for detecting a smoke by them.

PRIOR ART

Currently, smoke detectors comprising a photoelectric smoke sensor are widely used in commercial and residential rooms, as well as serve as an effective fire prevention tool.

One of the most widespread sensors are photoelectrical smoke sensors which operate according to a light scattering principle, owing to their accuracy, reliability and safety. Their important operation parameter, as well as in any other smoke sensor, is an ability to provide a maximum low level of false actuations, thereby enabling to increase the sensor's operation efficiency significantly.

A structure of the most currently existing photoelectrical sensors utilizes an infrared (IR) emitter and a photoreceiver which are arranged in an optical so-called "smoke" chamber. Their operation principle implies that a light from the IR emitter in a normal mode, i.e., when an air-gas mixture is present in the smoke chamber, does not get on the photoreceiver, since the light is not directed to the photoreceiver directly, but when external factors such as smoke, steam, dust etc. enter the air-gas mixture, the light from the emitter will be refracted and the photoreceiver will receive the scattered light reflected from an object, thereby causing an alarm signal. A drawback that results from using these sensors in the smoke detection devices is that they do not have any resolution, since such sensor reacts not only to the smoke, but to all non-transparent and semi-transparent objects, including a water steam and aerosols, thereby causing its frequent false actuation and inefficiency of use in dusty, gas-contaminated or humid environments.

In order to achieve said objective, recently, the smoke detection devices started to utilize photoelectrical scattered light sensors which utilize a plurality of emission sources having different wavelengths. The operation principle of these sensors implies that a reaction of emission of different wavelengths in response to external factors within the air environment is different, while comparison and analysis of a data of a plurality of emissions enable to detect a presence of the smoke itself with a higher accuracy, thereby reducing false alarms.

A prior art teaches a wide range of devices and methods for detecting a smoke using a photoelectrical scattered light sensor, and the applicant has selected several technical solutions among them, which are the closest to the proposed group of inventions in terms of a set of essential features.

U.S. Pat. No. 10,769,921-B2, issued Sep. 8, 2020, teaches a smoke detection device and method. According to the proposed technical solution, a smoke detector comprises a housing with a chamber that receives environmental particles such as, e.g., smoke or steam, a photoreceiver for receiving a light reflected from the chamber along a receiving axis, first, second and third emitters for emitting a light of different wavelengths into the chamber at different angles relative to the receiving axis. The smoke detection device further comprises a control unit that is configured to determine whether an alarm signal should be provided based on output signals generated by the photoreceiver resulting from light emitted into the chamber by the first, second, and third emitters, environmental particles towards the photoreceiver. Therewith, the control unit executes the following operations: activating the photoreceiver; activating the first light emitter that generates the emission into the chamber for receiving by the photoreceiver, whereupon the photoreceiver generates a first output signal; receiving and filtering the first output signal from the photoreceiver and determining whether the received and filtered first output signal exceeds a given threshold; if the threshold is exceeded, activating the second and the third light emitters which generate the emission into the chamber for receiving by the photoreceiver, whereupon the photoreceiver generates a second and a third signals respectively; calculating first, second and third ratios of the output signals based on values of the first, second and third output signals, and determining whether the alarm signal should be activated. Therewith, the first ratio of the signals may comprise relative levels of the first and second output signals, the second ratio of the signals may comprise, e.g., relative levels of the first and third signals, and the third ratio of the output signals may comprise relative levels of the second and third output signals. If a current state of the chamber should activate the alarm based on the values of the first, second and third ratios of the signals, the control unit further determines whether durations of the first, second and third output signals match those which are suitable for activation of the alarm, i.e., the first, second and third durations of the output signal are used by the control unit to identify false alarm scenarios or incorrect parameters of the photoreceiver. A drawback of the proposed technical solution is a complex algorithm for identifying whether the activation of the alarm signal is required based on determination of the ratios of the signals from three light emitters, as well as the fact that the optical chamber of the photoelectrical smoke sensor comprises a grid for receiving the environmental particles such as smoke or steam that is not equipped with an aerodynamic tunnel which is intended to effectively guide the particles towards the optical chamber.

U.S. Publication No. 2022/0120672-A1 published Apr. 21, 2022 teaches a smoke detection device comprising a casing having a smoke detection chamber provided therein, and a detector comprising a first light-emitting unit, a second light-emitting unit and a light-receiving unit with a photodiode. According to the proposed technical solution, the first light-emitting unit is configured to emit a light having a first wavelength into the smoke detection chamber, the second light-emitting unit is configured to emit a light having a second wavelength into the smoke detection chamber, wherein the second wavelength is greater than the first wavelength, and the light receiving unit is configured to receive the light emitted by the first and second light-emitting units. The casing of the detector further comprises a labyrinth that inhibits the light emitted by the first light-emitting unit and by the second light-emitting unit from reaching the light receiving unit. Therewith, the first wavelength of the first light-emitting unit is in a blue region of a visible light having a wavelength of 440-480 nm, the second wavelength of the second light-emitting unit is in a red region of a visible light having a wavelength of 610-750 nm. The control unit calculates a ratio between an intensity of the scattered light that is emitted by the first light-emitting unit and by the second light-emitting unit, and compares this ratio to a threshold, thereby identifying a type of the smoke that is present, i.e., black, gray or white. A drawback of the proposed technical solution is that it enables to identify the smoke itself (black, gray or white), but does not avoid a false actuation of the detector in case particles having a greater size, e.g., dust, reached an observation field, since a difference between the wavelengths of the first and second light-emitting units is not sufficient to provide the effective identification of the particles having the greater size, i.e., if the dust particles reach the smoke detection chamber, the false activation of the detector will occur with a high probability, thereby negatively affecting the operation efficiency of the latter. Furthermore, this solution implies a simultaneous operation and light emission by the light-emitting units, as well as a presence of an amplifier that amplifies a current from the light receiving unit and outputs the amplified current to the control unit, thereby negatively affecting a power consumption during use of said detector.

U.S. Pat. No. 9,541,501-B2 issued Jan. 10, 2017 teaches a smoke detection device having a detection unit that works according to a scattered light principle and comprises a two-color light-emitting diode that is configured to emit particles to be detected, and a photosensor spectrally sensitive to the particles which are detected by light scattering, wherein the light-emitting diode and the photosensor are arranged relative to each other such that a main optical axis of the light-emitting diode and an optical receiving axis of the photosensor define a light scattering angle. Therewith, the light-emitting diode comprises a first LED chip that is configured to emit a first light beam within a first wavelength range of 460 nm±40 nm or 390 nm±40 nm, and a second LED chip that is configured to emit a second light beam within a second wavelength range of 940 nm±40 nm or 860 nm±40 nm, wherein the LED chips are arranged one adjacent another on a holder. This technical solution implies a presence of a control unit that is connected to the light-emitting diode and to the detector that is configured to form an alarm signal in case a minimal smoke concentration value is detected. The detection unit further comprises a diaphragm mechanism having an opening that is arranged such that most of the light that is emitted by the first and second chips of the light-emitting diode is passed through the opening of the diaphragm in a range of from 50% to 85%, and, thus, from 50% to 15% of the light is shaded by the diaphragm mechanism, thereby resulting in a certain illumination reserve toward right and left, as well as upward and downward, in order to compensate for a slight tilting, rotating or displacement during assembly of the light-emitting diode. A drawback of the proposed technical solution is a complex mounting and adjustment of the detector which comprises the two-color light-emitting diode having two chips as compared, e.g., to a detector having two individual light-emitting diodes, besides, if one of the chips comprised in this light-emitting diode is failed, it will require a complete replacement of the latter.

Korean Publication No. 10-1963111-B2 published Jul. 31, 2019 has been taken as the closest analogue of the invention, the patent teaches a photoelectrical smoke detection device comprising a housing, a control unit having a power unit and a scattered light sensor connected thereto. The scattered light sensor comprises an optical smoke detection chamber, two light-emitting elements which emit a light having two wavelengths, and a photoelectrical element. A first light-emitting element generates an IR radiation having a wavelength of 850-940 nm, a second light-emitting device generates a blue light having a wavelength of 400-470 nm. If a value of a ratio between signals of the photoelectrical sensor which result from emission by the first and second light-emitting devices exceeds an ignition detection threshold, a fire will be detected. According to the proposed technical solution, the detection device comprises the housing that includes a support plate, a light-blocking wall provided on a top surface of the plate, the wall surrounds open portions of two fixation elements of the light-emitting devices, and a fixation element of the photoelectrical sensor in an open cylindrical shape, wherein a lower fixation portion of the support plate forms concentrical circles having a greater radius as compared to the light-blocking wall and a smaller height in order to block foreign materials from reaching the detector.

A drawback of the proposed technical solution is a complex structure of the fire detector that does not provide a sufficient level of protection against penetration of the foreign items inside the housing thereof, which items, if present, could distort the detection results and, thus, cause a false actuation of the fire detector. Besides, the solution implies a simultaneous operation and emission of the light by two light-emitting units, thereby negatively affecting an energy efficiency of said smoke detection device.

SUMMARY OF THE INVENTION

An objective of the group of inventions is to provide a structurally simple, reliable smoke detection device that could avoid any influence onto a gas flow made by external factors, configured to determine a nature of a gas mixture before activation of an alarm signal, equipped with a scattered light sensor, which provides a maximum sensitivity to a nature of a scattered emission from the gas flow, in particular, sizes of particles which prevail in this gas mixture, at a lower power consumption, and a method for detecting a smoke by means of them, the method providing a high capability of determining the nature of the gas mixture by the sensor and device. A technical effect achieved by the claimed group of inventions lies in that a probability of a false actuation of the device will be significantly reduced, if an aerosol other than smoke, e.g., a water steam or dust, is present within a sensitive area of the device, while the smoke is not present there. According to a first embodiment of the claimed invention, the objective is achieved by a smoke detection device comprising a housing, and a control unit with a power unit and a scattered light sensor connected thereto are arranged within the housing. The scattered light sensor consists of an optical chamber having a first emitter, a second emitter and a photoreceiver arranged therein, wherein an emission wavelength of the second emitter is smaller than an emission wavelength of the first emitter, and the photoreceiver has a bandwidth that includes the emission wavelengths of both the first and the second emitters. According to the invention, a difference between the wavelengths of the first and the second emitters is at least 470 nm+/−5%, and the photoreceiver has a sensitivity bandwidth of at least 700+/−5% nm, while a sensitivity fluctuation within this bandwidth is not greater than 10%.

Therewith, the control unit is configured to constantly supply power impulses to the first emitter only, as well as to connect the second emitter to the power unit upon a threshold signal arises at the photoreceiver, to determine levels of signals of the photoreceiver which arise during a successive supplying of the power impulses to the first and the second emitters, as well as to form an alarm signal if the signal level of the photoreceiver during a second emitter connection period is at least 20% greater than the signal level of the photoreceiver during a first emitter connection period.

The optical chamber is surrounded by a filtration chamber having inlet openings provided therein, the openings are coupled to the optical chamber via a labyrinth that gradually narrows and terminates with a ring slit that is provided along a circumference of the optical chamber.

The wavelengths of the emitters must be different, since an intensity of the scattered light changes depending on the wavelength when it is reflected from the particles of the gas flow and, thus, a difference of the signal level that arises at the photoreceiver changes as well. For example, if the water steam penetrates into the optical chamber, then a scattered emission signal having a smaller wavelength will be smaller than a scattered emission signal having a greater wavelength. And conversely, if the smoke is present in the chamber, and the smoke particles are smaller than the steam particles, the signal that arises from the scattered emission having the smaller wavelength will be greater than the signal that arises from the scattered emission having the greater wavelength. Therewith, the sensitivity of the photoreceiver within wide bandwidths usually is not the same for the emission having different wavelengths, and a non-uniformity of this sensitivity will increase when the wavelength range increases. During conduction of numerous tests, it has been found that a significant difference between the levels of the signals at the photoreceiver in case of radiation by the first and the second emitters will arise if a difference between the wavelengths of the first and the second emitters is at least 470 nm, while this difference may be further increased. A width of a spectral band range of the photoreceiver sensitivity is selected so as to sufficiently cover both lengths of the emitters and it is at least 700+/−5% nm, while in order to avoid exceeding of a signal from one wavelength over another signal due to sensitivity fluctuations within the range, during simulation of the device, it has been found that the photoreceiver sensitivity fluctuations within this band must be not greater than 10%, while any further increase at these wavelengths and within said sensitivity band will be perceived by the control unit as the exceeding of the signal of one of the wavelengths over another signal and will be indicative of a nature of the gas mixture or aerosol that has penetrated into the optical chamber, thereby resulting in a false determination of the smoke presence.

The fact that the control unit is configured to continuously supply the power to the first emitter, while supplying the power to another emitter only when the first emitter reacts to the change of the medium within the optical chamber, as well as to generate the smoke presence signal when the signal value from the second emitter is at least 20% greater than the signal value from the first emitter, enables to determine the nature of the gas mixture within the optical chamber considering the difference of the signals during the alternating operation of the first and second emitters, and, thus, to reduce the false actuation probability.

The filtration chamber that is arranged around the optical chamber and provided with the inlet openings enables to filter out possible solid particles which are present in an upstream of the air-gas mixture, as well as to guide this stream to the optical chamber through the labyrinth, while successively narrowing its total cross section and sealingly passing through the slit that is formed between the chambers, thereby enabling to concentrate the stream in the radiation area of both emitters.

According to a possible exemplary embodiment of the device, the filtration chamber may be divided into sectoral compartments, thereby further facilitating the guiding of the air-gas flow into the optical chamber. This structural design enables to avoid fluctuations of the photoreceiver signal due to non-homogeneity of the gas mixture and, thus, to increase the overall device sensitivity, thereby facilitating the achievement of said technical effect.

According to another possible exemplary embodiment of the device, a cone-shaped guide is provided at a place of junction to the ring slit in the optical chamber. This further enables to concentrate the gas mixture flow within those area from which a major portion of the scattered emission enters the photoreceiver's field of view. This is important in case the smoke is released weakly and a smoke screen is relatively small, or when the smoke is displaced from the sensor by arbitrary occurring non-vertical flows.

According to a second embodiment of the claimed invention, the objective is achieved by providing a scattered light sensor for a smoke detection device, the sensor comprises a chamber with two emitters and one photoreceiver arranged within the chamber, and a first emitter has an emission range of 940 nm+/−5%, a second emitter has an emission range of 470 nm+/−5%, and the photoreceiver has a sensitivity range from 400 nm to 1100 nm, the first emitter generates an emission in a cone having a solid angle of maximum 5 degrees, and the second emitter generates an emission in a cone having a solid angle of maximum 9 degrees, and the emitters and the photoreceiver are arranged along a circumference of the optical chamber with an angle of 15+/−2 degrees formed between an optical axis of each of the emitters and a horizontal plane, an angle of 23+/−2 degrees formed between optical axes of the first and second emitters, and an angle of 22+/−2 degrees formed between an optical axis of the photoreceiver and the horizontal plane.

In order to achieve the technical effect, the optical elements must be arranged such that the first and the second emitters guide the emission beams so as they could permeate a gas mixture and, if the smoke is present, they could lead to creation of a scattered emission within a field of view of the photoreceiver, while a direct emission must not be visible for the photoreceiver. Therefore, during a simulation process, it has been found that said solid angles of the emitters provide the distribution of the scattered light from particles which the beams of the emitters fall on, thereby providing the required flow intensity level and, thus, the required photoreceiver sensitivity.

At the same time, it has been found that owing to said angles provided between the axes of the emission beams, to an inclination of the emission beams relative to the horizontal plane, and to the photoreceiver arrangement, it is enabled to avoid the direct emission from getting on the photoreceiver and to form a gas mixture radiation area of a sufficient volume and, thus, to form the scattered emission level in the field of view of the photoreceiver that is sufficient for a threshold signal to arise. If these angles are increased, the gas mixture radiation area will be increased, thereby positively affecting the sensitivity, however, it has been unexpectedly found that the increased radiation area increases a probability that a non-homogeneous gas mixture will be formed and, thus, different signal levels to the photoreceivers will be formed during a single measurement cycle, while these signal levels depend not on a nature of the particles of the gas mixture, but on a level of the distribution uniformity of the gas mixture across the volume. These circumstances lead to false actuations or require to increase the number of detection cycles and, thus, a time that is required to form the alarm signal, which is not acceptable. The arrangement of the optical elements at these specific angles will provide the sufficient sensitivity of the sensor and will allow to avoid the influence that is possibly made by the non-uniformity of the gas flow.

According to possible exemplary embodiments of the sensor, an internal surface of the optical chamber has a coating that absorbs the emission, and the emission intensity of the emitters within the solid angles of 5 and 9 degrees is at least 15 cd. This structural design of the sensor increases its sensitivity and reduces the power consumption.

A method for detecting the smoke, according to a third embodiment of the invention, comprises steps of periodical supplying a power to a first emitter that generates an emission beam having a wavelength of 940 nm+/−5% to an optical chamber having a photoreceiver arranged therein, periodically supplying the power to a second emitter after a scattered emission signal of the first emitter arises at the photoreceiver, the second emitter generates an emission beam having a wavelength of 470 nm+/−5% to the optical chamber, determining, by a control unit, a level of the scattered emission signals on the photoreceiver which arise during an operation period of each emitter, and comparing the signal level that arises during an operation period of the first emitter and the signal that arises during the operation period of the second emitter. When the signal level is greater than a given threshold and when the signal level that arises during the operation period of the second emitter is more than 20% greater than the signal level that arises during the operation period of the first emitter at least during a period of from 3 to 10 seconds, the control unit will generate a signal indicative of a presence of the smoke in the chamber. This method enables to divide the signals that result from the scattered emission of the gas mixture caused by each emitter, to measure and to compare them individually. This allows to increase the accuracy of differentiating of the particles comprised in the air-gas mixture and to avoid the false actuation of the alarm, if there is no smoke. Therewith, the power is supplied to the emitters in groups of 12 impulses having a width of 3 ms and a period of 16 ms, and the groups of the power impulses are supplied with a periodicity of from 3 to 10 seconds, thereby enabling to reduce the power consumption and, thus, to prolong a service life of the emitters as compared to the continuous powering of both emitters simultaneously, as well as to facilitate a long-term use of the device. Said parameters of the impulses may represent the device settings, if the nature of possible gas mixtures in the environment at the mounting place of the device is known, e.g., frequent fogs, dust storms, smog or other known factors.

BRIEF DESCRIPTION OF THE DRAWINGS

In order to provide more complete understanding of the claimed invention and advantages thereof, the following description provides an explanation of possible exemplary embodiments thereof with a reference to figures of the appended drawings, wherein identical designations denote identical parts, and which illustrate the following:

MAIN DESIGNATIONS

Figure 1:
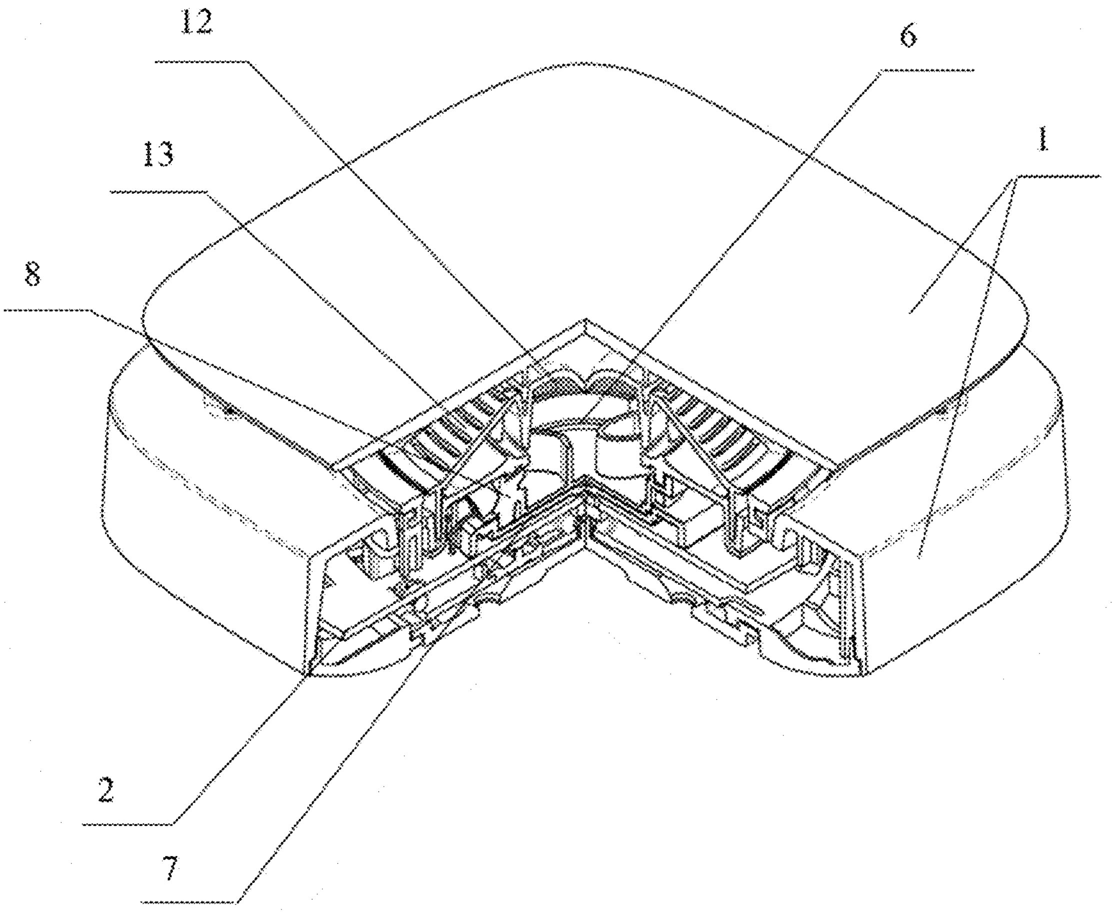
FIG. 1 illustrates a general axonometric view of the smoke detection device in a partial cross section.
Figure 2:
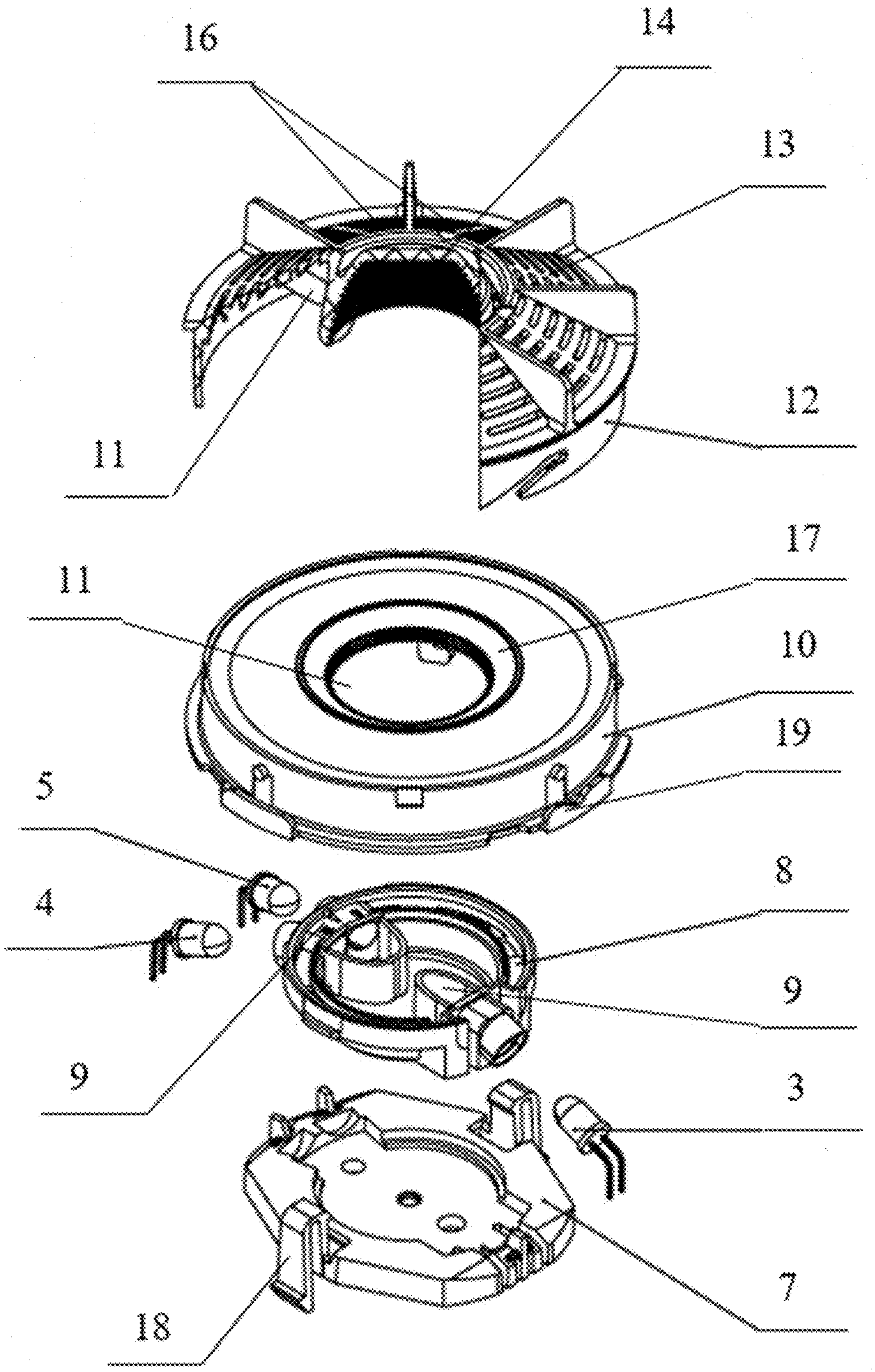
FIG. 2 shows an exploded view of the structural elements of the scattered light sensor of the smoke detection device.
Figure 3:
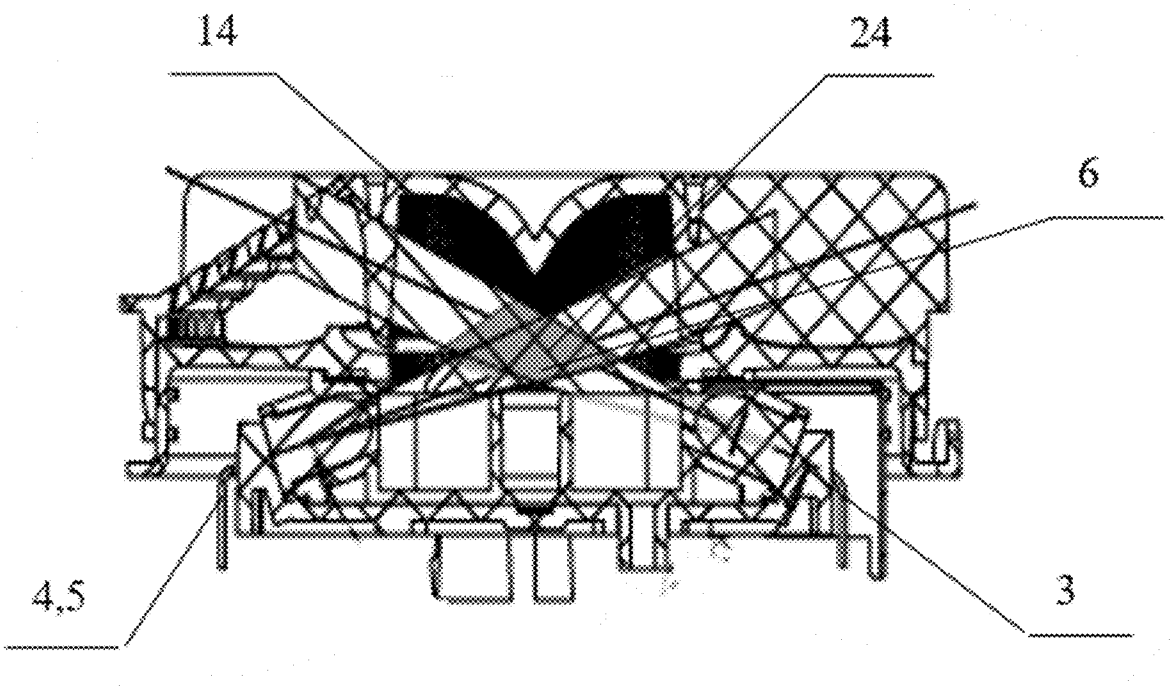
FIG. 3 illustrates a longitudinal section of the scattered light sensor showing the optical axes of the emitters and the photoreceiver.
Figure 4:
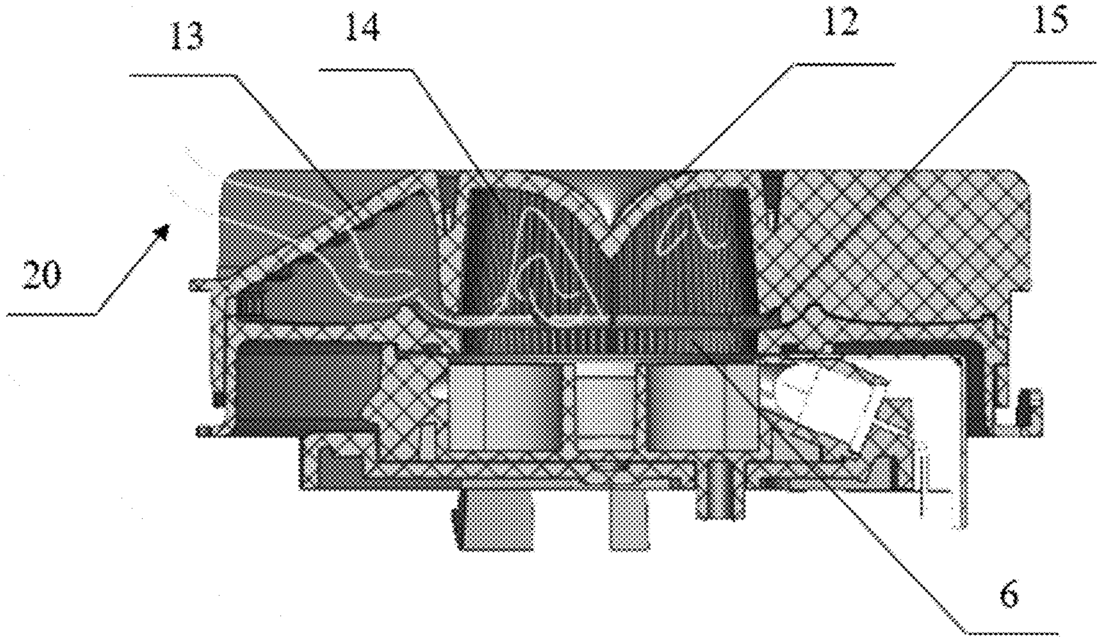
FIG. 4 illustrates a longitudinal section of the scattered light sensor of the smoke detection device showing the passage of the air-gas mixture flow.
Figure 5:
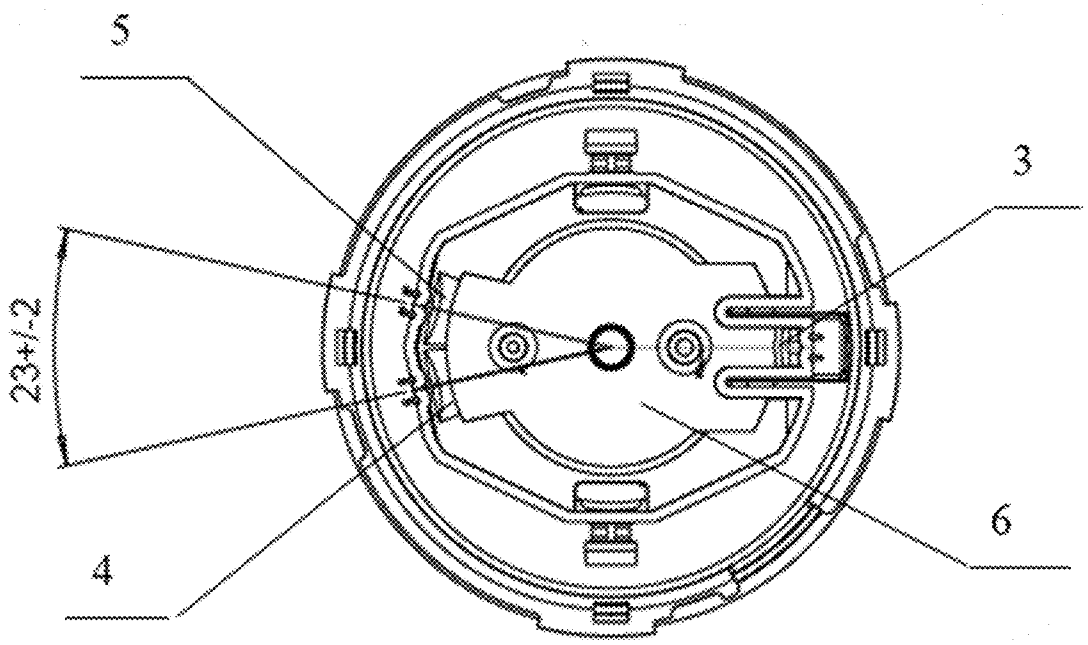
FIG. 5 illustrates a top view of an internal element of the optical chamber showing a convergence angle of the emitters.
Figure 6:
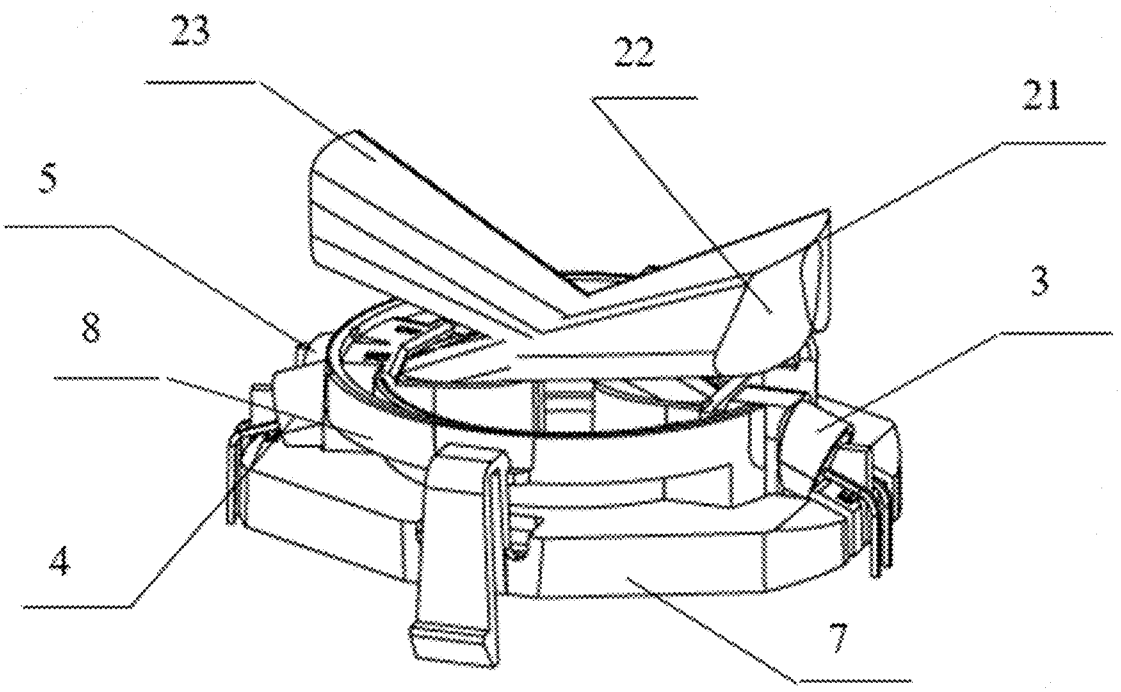
FIG. 6 illustrates an axonometric view of a support element with the internal element of the optical chamber showing the emission cones and the field of view of the photoreceiver.
Figure 7:
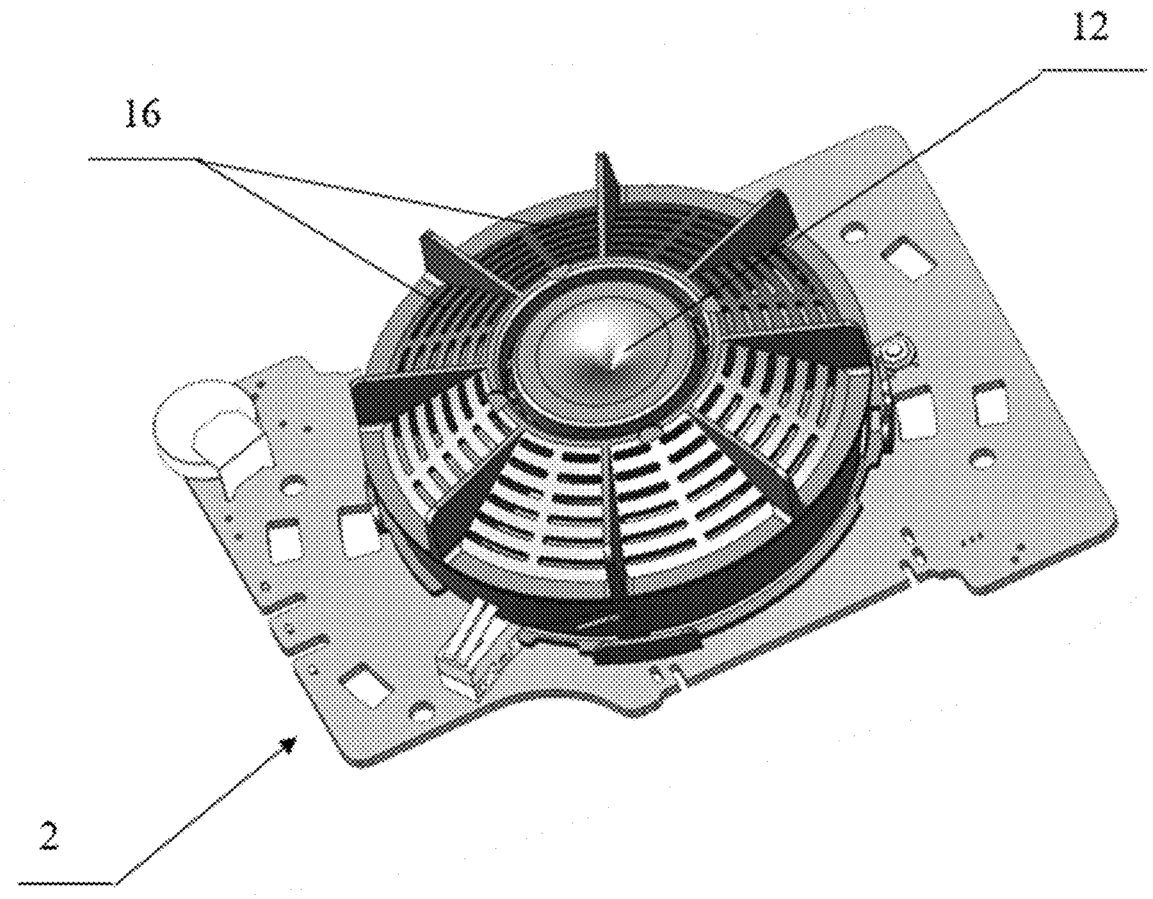
FIG. 7 illustrates an axonometric view of the sensor's connection to the electronic components of the device.

1. housing,
2. circuit board with the control unit,
3. photoreceiver,
4. first LED,
5. second LED,
6. optical chamber,
7. base,
8. internal element of the optical chamber,
9. guiding channels,
10. casing of the optical chamber,
11. opening of the casing of the optical chamber,
12. filtration chamber,
13. openings of the filtration chamber,
14. central portion of the filtration chamber,
15. slit,
16. sectoral compartments of the filtration chamber,
17. cone-shaped guide,
18. elements for fixing the base of the optical chamber to the circuit board,
19. elements for fixing the filtration chamber to the optical chamber,
20. indication of the gas flow trajectory,
21. emission beam of the first emitter,
22. emission beam of the second emitter,
23. field of view of the photoreceiver,
24. convergence area of the emission beams in the field of view of the photoreceiver.

IMPLEMENTATION OF THE INVENTION

A smoke detection device consists of a housing 1 having a control unit and a power unit which are provided on a circuit board 2 and connected to a scattered light sensor that consists of a photoreceiver 3, a first emitter 4 and a second emitter 5 which are arranged in an optical chamber 6. A blue LED is used as the first emitter 4, and it has a wavelength of 940 nm, while an infrared LED is used as the second emitter 5, and it has a wavelength of 470 nm. This selection is caused by providing a maximum difference between the wavelengths and a wide availability of LEDs having these wavelengths. Blue and infrared LEDs manufactured by VISHAY, OSRAM etc. may be used as said emitters. In order to provide a maximum sensitivity within these wavelengths, the photoreceiver having a wide spectrum within a range from 400 nm to 1100 nm is used. A photodiode manufactured by Everlight or OSRAM may be used as the photoreceiver. The selected range having a sensitivity fluctuation within this range of not greater than 10% provides almost the same sensitivity for said wavelengths and has a low reaction time, thereby positively affecting the accuracy and power consumption, since measurements are performed with shorter impulses.

The optical chamber 6 is arranged on a base 7 that is secured to the circuit board 2 of the smoke detection device, and the optical chamber (6) is formed by an internal element 8 having walls which are provided with guiding channels 9 for positioning the LEDs 4, 5 and the photoreceiver 3, and by a casing 10 having a central portion that is provided with an air-gas mixture passage opening 11. The optical chamber is surrounded by a filtration chamber 12 with openings 13 provided around its circumference, the openings are separated from its central portion 14 by a wall. Therewith, the filtration chamber 12 is connected to the casing 10 of the optical chamber 6 such that a slit 15 is formed in a point of convergence of the central portion 14 with the opening 11 of the optical chamber 6. Therewith, at those places where the openings 13 are provided, the filtration chamber 12 may be divided into sectoral compartments 16, and the opening 11 for the air-gas mixture passage that defines the connection point between the ring slit 15 of the optical chamber 8 and the filtration chamber 12 is equipped with a cone-shaped guide 17 that is directed to the optical chamber 6. This structural design enables to filter it from the dust particles, which are separated from the gas mixture that, according to the heat flow principle, raises upwards and facilitates the passage of the air-gas mixture flow directly into that portion of the optical chamber 6 which is visible for the photoreceiver.

It has been experimentally found that the most effective arrangement of the optical elements in said structure is the one where the emitters and the photoreceiver are arranged along the circumference of the optical chamber, while forming an angle of 23+/−2 degrees between the optical axes of the first and second emitters. Therewith, the formation of the emission beams 21, 22 having solid angles of up to 5 degrees and up to 9 degrees respectively, as well as the arrangement of the optical axes of the emitters at an angle of 15+/−2 degrees and the arrangement of the optical axis of the photoreceiver at an angle of 22+/−2 degrees relative to a horizontal plane of the optical chamber, enable to achieve a high intensity of the emission beams in a convergence area 24 between them and the field of view 23 of the photoreceiver. The field of view 23 of the photoreceiver means a solid angle having a peak within a focal plane of the photoreceiver 3 that usually coincides with a sensitive element in which the scattered emission of the gas mixture leads to the signal that arises at the sensitive surface of the photoreceiver 3. The convergence area 24 of the beams is a portion of the field of view 23 of the photoreceiver that could be alternately radiated by each of the emitters and represents an intersection area between three solid angles.

Said structural design enables to arrange the emitters substantially opposite to the photoreceiver and to provide their maximum focusing in the central portion of the optical chamber regardless of its dimensions and providing the effective operation of the device at lower energy consumption.

The scattered light sensor operates according to the principle implying that the light from the emitters in a normal mode, when the chamber is empty, does not get on the photoreceiver, but if the optical chamber is filled with smoke, steam, aerosol etc., the light from the emitters will be refracted and reflected by the gas mixture particles and get on the photoreceiver. Since the claimed structure utilizes two emitters having different wavelengths, then upon passage of the light wave through a volume of the portion of the optical chamber, the wave will be scattered differently, since the particles which penetrate into the chamber have different size and, thus, a different refraction coefficient for the emission with the different wavelength. In this case, the smoke detection method implies that the first emitter having the wavelength of 940 nm continuously generates the emission impulses and creates the beam having the solid angle of maximum 5 degrees that intersects with the field of view of the photoreceiver. If the gas mixture or aerosol penetrates into the optical chamber, the scattered emission from the gas mixture particles will occur, while a part of the mixture is within the convergence area of the emission beams and within the field of view of the photoreceiver, and the signal will arise at the sensitive element of the photoreceiver. If the signal level is greater than the threshold, the control unit initiates supplying of the power impulses to the second emitter having the wavelength of 470 nm, thereby leading to arising of the emission beam having the solid angle of maximum 9 degrees that intersects with the field of view of the photoreceiver and with the emission beam of the emitter having the wavelength of 940 nm, thereby leading to the scattered emission that arises from the gas mixture particles and, thus, to the signal on the sensitive element of the photoreceiver.

The power impulses are supplied to the emitters alternately such that the signals which arise from the scattered emission of the gas mixture that is caused by each emitter can be measured separately from each other. At the same time, the consumption of a power element is reduced and, thus, its service life is increased as compared to the continuous powering of both emitters at the same time.

The control unit determines the levels of the signals on the photoreceiver which arise from the scattered emission caused by each of the emitters and compares them between each other.

Figure 8:
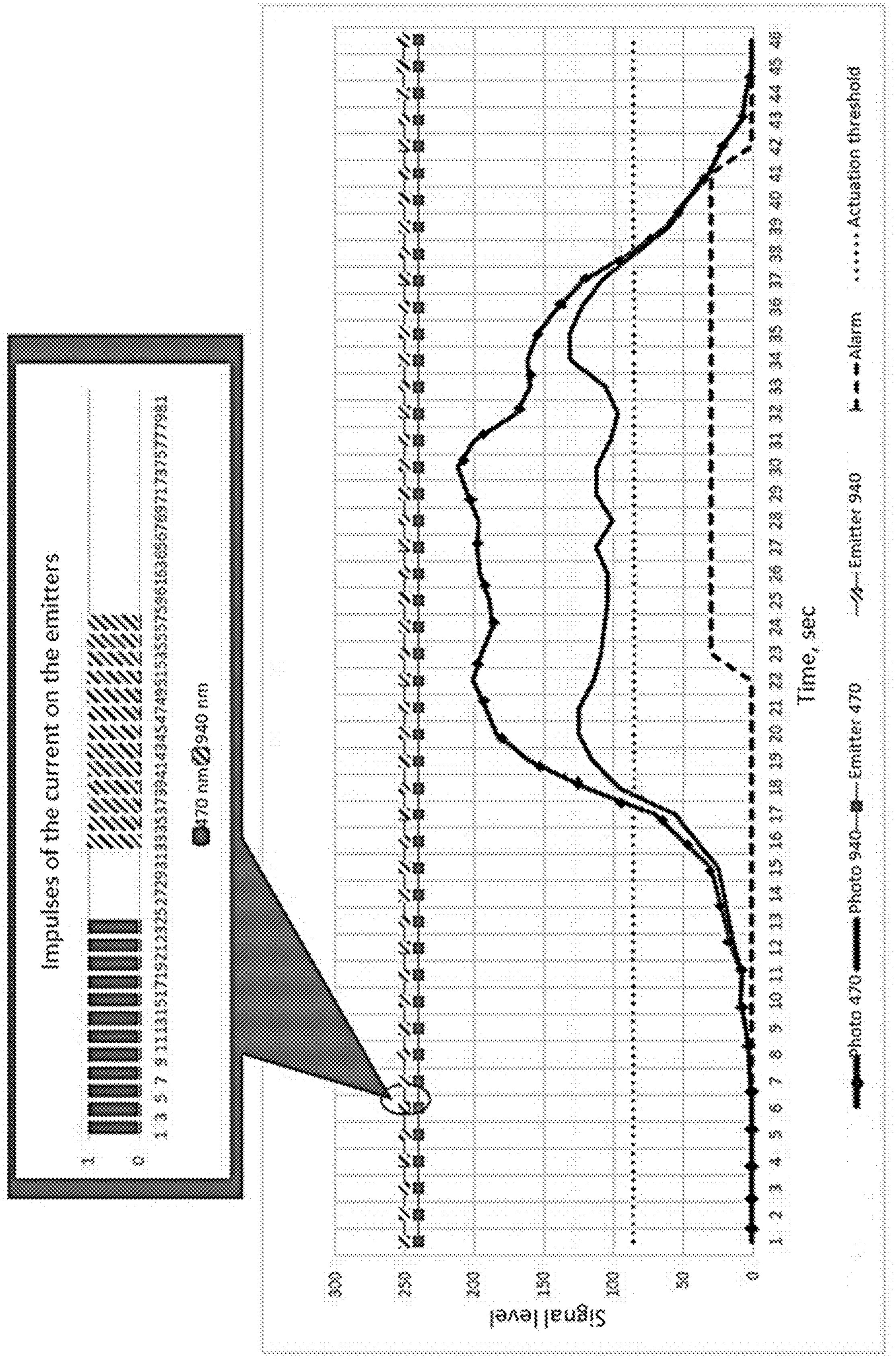
FIG. 8 illustrates a plot of supplying the power impulses to the emitters and of the signals which arise at the photoreceiver in case the smoke has penetrated into the optical chamber.

If the comparison results in that the signal from the scattered emission caused by the second emitter having the wavelength of 470 nm is at least 20% greater than the signal from the scattered emission caused by the first emitter having the wavelength of 940 nm, the control unit will generate the alarm signal. Plots of the signals which arise in this case are illustrated in FIG. 8.

Figure 9:
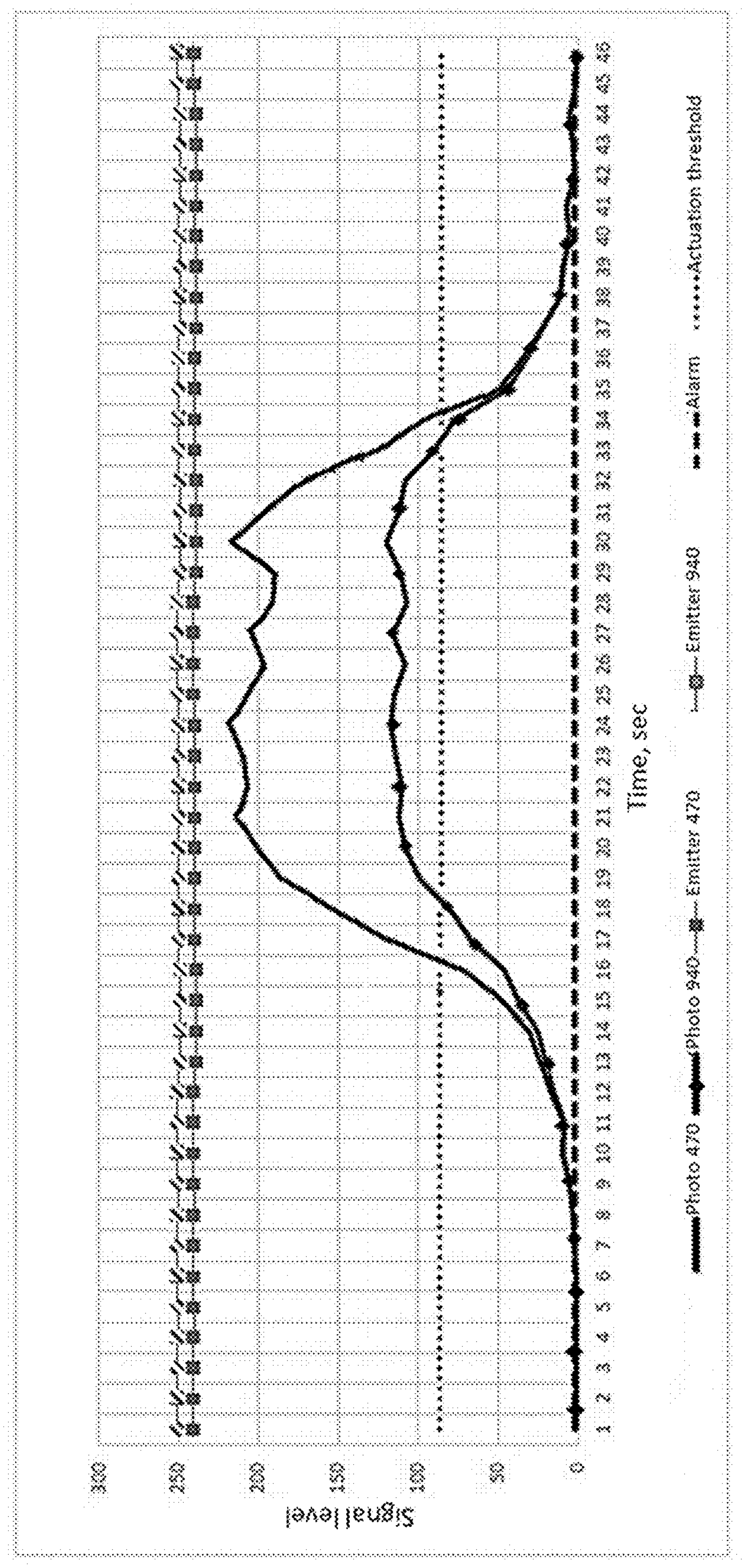
FIG. 9 illustrates a plot of supplying the power impulses to the emitters and of the signals which arise at the photoreceiver in case the water steam has penetrated into the optical chamber.

If the comparison of the signals results in that the signal from the scattered emission caused by the first emitter having the wavelength of 940 nm is greater than the signal from the scattered emission caused by the second emitter having the wavelength of 470 nm, the device will determine the mixture as the steam or another aerosol other than the smoke resulted from burning, and the alarm signal will not be generated. Plots of the signals which arise in this case are illustrated in FIG. 9.

The combination of the above-described features of each of the technical solutions enables to provide the simple and structurally reliable smoke detection device that provides the reliable filtration of the air-gas mixture and directing its flow directly to the scattered light sensor detection area, while the parameters of the sensor provide the accurate concentration of the detection area in the convergence area of the emission beams, and the mentioned developed method determines the effective sequence of processing the detection results that minimizes false actuations of the device.

Therefore, the claimed group of inventions unites the claimed technical solutions with a single inventive concept and provides the achievement of the technical effect.

The invention claimed is:

1. A smoke detection device comprising a housing, a control unit with a power unit and a scattered light sensor connected thereto arranged within the housing, wherein the scattered light sensor comprises an optical chamber having a first emitter, a second emitter and a photoreceiver arranged therein, and an emission wavelength of the second emitter is smaller than an emission wavelength of the first emitter, and the photoreceiver has a bandwidth that includes the emission wavelengths of both the first and the second emitters, wherein the wavelength of the second emitter is at least 470 nm+/−5% smaller than the wavelength of the first emitter, and the photoreceiver has a sensitivity bandwidth of at least 700+/−5% nm, while a sensitivity fluctuation within this bandwidth is not greater than 10%; wherein the control unit is configured to constantly supply power impulses to the first emitter, as well as to connect the second emitter to the power unit when a threshold signal arises at the photoreceiver, to determine levels of signals of the photoreceiver that arise during a successive supply of the power impulses to the first and the second emitters, as well as to form an alarm signal if the signal level of the photoreceiver during a second emitter connection period is at least 20% greater than the signal level of the photoreceiver during a first emitter connection period; and wherein the optical chamber is surrounded by a filtration chamber having inlet openings provided therein, the openings being aerodynamically coupled to the optical chamber via a labyrinth that terminates with a ring slit that is provided between the optical chamber and the filtration chamber along a circumference of the optical chamber.

2. The device according to claim 1, wherein the filtration chamber is divided into sectoral compartments at places where the openings are provided.

3. The device according to claim 1, wherein a cone-shaped guide is provided at a place of junction to the ring slit in the optical chamber.

4. A scattered light sensor for the smoke detection device according to claim 1, the sensor comprising a chamber with two emitters and one photoreceiver arranged within the chamber, wherein a first emitter has an emission range of 940 nm+/−5%, a second emitter has an emission range of 470 nm+/−5%, and the photoreceiver has a sensitivity range from 400 nm to 1100 nm; wherein the first emitter generates an emission in a cone having a solid angle of maximum 5 degrees, and the second emitter generates an emission in a cone having a solid angle of maximum 9 degrees, and the emitters and the photoreceiver are arranged along a circumference of the optical chamber with an angle of 15+/−2 degrees formed between an optical axis of each of the emitters and a horizontal plane, an angle of 23+/−2 degrees formed between optical axes of the first and second emitters, and an angle of 22+/−2 degrees formed between an optical axis of the photoreceiver and the horizontal plane.

5. The sensor according to claim 4, wherein an internal surface of the optical chamber has a coating that absorbs the emission of the emitters.

6. The sensor according to claim 4, wherein the emission intensity of the emitters within the solid angles of 5 and 9 degrees is at least 15 cd.

7. A method for detecting smoke, the method comprising:

periodical supplying power to a first emitter that generates an emission beam having a wavelength of 940 nm+/−5% to an optical chamber having a photoreceiver arranged therein;

periodically supplying power to a second emitter after a scattered emission signal of the first emitter arises on the photoreceiver, the second emitter generating an emission beam having a wavelength of 470 nm+/−5% to the optical chamber;

determining, by a control unit, a level of the scattered emission signals on the photoreceiver that arise during an operation period of each emitter, and comparing the signal level that arises during the operation period of the first emitter and the signal level that arises during the operation period of the second emitter; and generating, by the control unit, a signal indicative of a presence of the smoke in the chamber, when the signal level is greater than a given threshold and when the signal level that arises during the operation period of the second emitter is more than 20% greater than the signal level that arises during the operation period of the first emitter at least during a period of from 3 to 10 seconds.

8. The method according to claim 7, wherein the power is supplied to the emitters in groups of 12 impulses having a width of 3 ms and a period of 16 ms.

9. The method according to claim 7, wherein the groups of power impulses are supplied with a periodicity of from 3 to 10 seconds.

* * * * *